Patented Sept. 6, 1938

2,129,161

UNITED STATES PATENT OFFICE 2,129,161

PREPARATION OF DITITANOSO-TITANIC-CARBOXIDE

Charles J. Kinzie and Eugene Wainer, Niagara Falls, N. Y., assignors to The Titanium Alloy Manufacturing Company, New York, N. Y., a corporation of Maine No Drawing. Application August 28, 1936, Serial No. 98,354

17 Claims. (Cl. 23—203)

Our invention relates to improved methods for the recovery of titanium minerals from therewith entangled zirconium ores, more particularly from zircon or zirconium silicate, as well as to the production of a new composition of matter in the form of dititanoso-titanic-carboxide.

It is now well known that the separation of ordinary rutile or brookite, both which have an appreciable FeO and $Fe_2O_3$ content from 1 to 10 per cent ordinarily, from zircon ($ZrSiO_4$), is not a particularly simple matter, when approached by mechanical means.

The best method is that of magnetic separation, which in the case of brookite and rutiles having an appreciable iron content and therefore definitely more magnetic than the $ZrSiO_4$, yield titanium minerals with plus 90 per cent $TiO_2$ content. We refer, of course, to beach sands containing unentangled separate grains of brookite, rutile, along with the zircon.

Our researches have led to the discovery that in the case of some of the most extensive zircon-rutile beach sand deposits, what formerly was regarded as ilmenite and rutile minerals associated with $ZrSiO_4$, really is mainly a very low iron brookite, which because it is an optically opaque mineral, has been, and still is, confused and regarded as ilmenite.

In the case of one beach sand deposit, which after removing the free quartz sand by gravity table washing left a rough concentrate that contained according to mineral count approximately

| | Per cent |
|---|---|
| Zircon | 58 |
| Ilmenite | 20 |
| Rutile | 15 |
| Magnetite | 2 |
| Chromite | 3 |
| Free quartz | 1 |
| Others | 1 |
| | 100 |

This material has been under study for a number of years many exhaustive concentration studies having been made with the result that up to this time no titanium oxide mineral in any worthwhile yield has been produced containing over 80 per cent $TiO_2$.

We have now discovered that if this sand is washed relatively free of salt, and in form of free flowing sand is passed over an induction magnetic separator practically all the ilmenite, magnetite, chromite, along with a magnetic light colored sand is removed, leaving a zircon brookite concentrate, which contained, according to authorities and based on microscopic analysis—

| | Per cent |
|---|---|
| Zircon | 70 |
| Ilmenite or high iron rutile | 15 |
| Brookite and rutile | 12 |
| Free quartz | 1 to 2 |
| Others | 1 to 2 |

Exhaustive attempts at obtaining a 90% $TiO_2$ content mineral from this concentrate have failed. A part (about 60%) of the total zircon content could be readily withdrawn by high intensity induction magnetic separators.

Another part, about 30%, of the total titanium mineral content was removed as a sand containing about 75% $TiO_2$ and about 25% zircon, etc.

The balance of the titanium mineral and the zircon proved to be so close as regards magnetic susceptibility as to render separation by this means impossible.

Exhaustive chemical analysis disclosed the fact that what had been for years counted as ilmenite, or else an iron bearing rutile, was in fact an optically opaque relatively pure very low iron brookite, and, also what had been regarded as ordinary brookite and rutile was also very low in iron content. In fact chemical analysis proved that the concentrate contained substantially as follows:—

| | Per cent |
|---|---|
| Zirconium oxide | 47.00 |
| Silica | 25.00 |
| $TiO_2$ | 25.00 |
| Iron calculated $Fe_2O_3$ | 0.10 |
| Others—$Al_2O_3$, $P_2O_5$—rare earths, etc. | 2.90 |
| | 100.00 |

This may be translated to minerals content as follows:—

| | Per cent |
|---|---|
| Zircon | 70 |
| Brookite and rutile | 25 |
| Free quartz | 2 |
| Others | 3 |
| | 100 |

This determination threw a new light on the problem, and explained why in the past exhaustive mechanical separation, electrostatic, induction magnets, etc., worked experimentally by a number of authorities in ore dressing, coupling their work with microscopic analysis, had failed to accomplish the separation, since what had been considered to be an iron bearing mineral was in fact iron free, and was also very close to the properties of the considerable part of the zircon content.

Our own exhaustive studies have resulted in the discovery that an appreciable amount of the zircon grains carry a microscopic speck of attached black mineral which probably explains our finding that actually some of the zircon grains are more magnetic than the titanium mineral. Others are of about the same magnetic susceptibility as the titanium mineral, still others slightly less susceptible than the titanium mineral, and as has been stated, a substantial part of the zircon differs in magnetic susceptibility to a sufficient degree so that this part may be separated.

Based on the above findings, it became clear to us that an entirely new problem was indicated, if a +90% $TiO_2$ mineral in high yields was to be obtained, and, also, if as is important, the balance of the more magnetic zircon grains were to be recovered in usable form.

As a result of many experimental attempts, we have now discovered that by heating a mixture of the rough rutile-zircon concentrate with an amount of carbon weighing less than the weight of the rutile-zircon concentrate under reducing conditions at a temperature of 900° C. to about 1600° C., a remarkable change occurred.

We found upon cooling the charge out of contact with oxygen that all the titanium mineral grains had been altered fundamentally. The formerly smooth crystals were now velvety in surface, although the grains had not changed materially in size. Practically all were badly scorified, split, fissured, etc., but still intact as grains. The color under the microscope may vary through velvety black, very dark brown, imperial blue and very dark green, all with dull opaque surfaces having a soft aesthetic appearance. The zircon grains were not apparently affected by the treatment.

We also found that the titanium mineral produced could now be separated from the zircon. First the excess carbon, if any, was removed by sieving, air classification, etc., and the mixture of zircon and the new compound is then separated by utilizing its now very definite difference in magnetic susceptibility or by gravity separation, as, for example, a wet table, dry air table, etc. Since there is a marked difference in specific gravity between the zircon and the new compound, the gravity separation is no doubt also greatly assisted by the fact that the new compound grains are fissured, split, etc., thus increasing the buoyancy of same as compared with the zircon which is still the dense crystalline mineral substantially unaffected.

The specific gravity of the zircon is about 4.70, while that of the dititanoso-titanic-carboxide is about 3.93. The specific gravity of the rutile and brookite in the original sand was about 4.30.

We prefer to work at temperatures high enough to yield a quick reaction for sake of economy, while at the same time maintaining all the grains free and separate from each other. If the temperature is too high 1700–1800° C., the charge will sinter and our purpose is defeated.

The reaction may be produced by heating a number of hours at say 1200° C. for six hours, or at about 1600° C. for a few minutes. In either event the resultant product consists of free-flowing unattached grains susceptible to separation by known mechanical methods. The reaction may also be produced at 900° C. for 24 to 36 hours, or for 12 to 16 hours at 1000° C.

Therefore not only has a new compound of titanium been produced, but the titanium part of these vast zircon-rutile deposits is now made available, while incidentally that part of the zircon formerly considered inseparable is now made available for commercial use.

The titanium compound which we claim as new in its pure state is of the following composition by chemical analysis:

|   | Per cent |
|---|---|
| Ti | 65.45 |
| O | 29.10 |
| C | 5.45 |
|   | 100.00 |

Such titanium compound corresponds to the empirical formula of $Ti_3O_4C$.

The preferred formula might also be written as $$TiOC$$
$$Ti_2O_3$$

In the appended claims such titanium compound is designated as dititanoso-titanic carboxide, since the only possible structure for $Ti_3O_4C$ based on analysis and reactions in dilute acids shows the presence of two reduced titanium groupings, one oxidized titanium group, and a combined carbon grouping.

As we have stated satisfactory decomposition may be obtained by heating the mixture long periods at 900° C., the temperature at which reaction begins. We have found that at the lower temperatures the reaction may only proceed part way into each titanium oxide mineral grain, but still the desired separation results since the specific gravity is sufficiently lowered and the grain surfaces rendered buoyant by fissures, etc. Thus our purpose may be accomplished by only a partial reaction, if desired, in which case the product produced as a whole may contain very little carbon. On the other hand, if the temperature is on the upper limit more combined carbon may occur, for example, up to 8 to 10 per cent.

Practically there may be a per cent or so of zircon, a per cent free carbon and a small amount of iron, about 0.10% to 0.4%, with small amounts of impurities inherent from the starting mineral.

Although this compound was discovered in the aforesaid separation experiments, it does not follow that we confine ourselves to its production during course of such separations. It follows naturally that, if desired, such compound could be made from precipitated $TiO_2$ or a sufficiently pure titanium oxide obtained by any other means by first calcining to about 1300° C. to shrink to dense form, grinding to produce say —40 mesh grains, mixing with carbon, adding some pure $ZrSiO_4$ —35 mesh grains, if needed to keep separate, and then heating as we have already described.

Being a reactive compound, it will be useful in producing titanium salts, for instance $TiCl_4$ by chlorination, or salts may be derived corresponding to any acid in which it is soluble; for example, titanyl sulphate will result by reaction with $H_2SO_4$.

Such titanium compound should prove a valuable material as coating for welding rods in place of the commonly used $TiO_2$ and rutiles, since the two latter contain only from 90 to 98 per cent $TiO_2$, 100 parts by weight of these rutiles or $TiO_2$ are chemically equivalent to 90 to 98 per cent parts by weight of pure $TiO_2$, whereas 100 parts by weight of our dititanoso-titanic carboxide are chemically equivalent to 108 parts by weight of pure $TiO_2$.

Since this compound is low in iron and other impurities, its use is indicated for many applications not heretofore possible with the more expensive relatively pure rutiles, $TiO_2$, etc., formerly available.

The following example will serve to illustrate our improved methods of separating zircon and titanium oxide minerals with production of the new compound dititanoso-titanic-carboxide.

Rough beach concentrates and the like containing zircon, brookite and rutile are first subjected to high intensity induction or other suitable magnetic separation, resulting in the recovery of as much of the zircon in as pure a state as possible. In some cases about 45 to 60 per cent of all the zircon present has been recovered in form of a relatively pure $ZrSiO_4$ containing—

| | Per cent |
|---|---|
| $ZrSiO_4$ | 98.00 |
| $TiO_2$ | 0.07 |
| $Fe_2O_3$ | 0.02 |
| Free $SiO_2$ | 0.50 |
| $Al_2O_3$, $P_2O_5$, rare earths, etc. | 1.41 |
| | 100.00 |

There is also produced according to our methods a fraction containing practically all the titanium minerals present, and which may conveniently contain—

| | Per cent |
|---|---|
| $TiO_2$ | 50 to 60 |
| $ZrSiO_4$ | 45 to 35 |
| Iron (reported as $Fe_2O_3$) | 0.10 to 0.20 |
| Others | About 5 |

This mixture of mechanically free, but practically inseparable, rutile, brookite and zircon is mixed with —80 mesh calcined petroleum coke or other carbon powders —80 mesh or finer, and preferably free of volatile matter, using 10 to 25 parts by weight coke to 100 parts by weight rutile-zircon concentrate. This mixture is heated preferably in a carbon sagger in an electric resistance furnace to about 1400 to 1600° C. At this temperature the reaction takes place quickly, the charge is cooled, discharged and subjected to mechanical separations treatment to effect the removal of free carbon, if any is present. The separation of the dititanoso-titanic carboxide results in the recovery of practically all the entering titanium minerals in the form of this new compound, and additionally the recovery of the zircon as a separate fraction, which may then be, if necessary, further cleaned by known processes.

If the carbon used in batch is fine enough, say all —300 mesh, that part remaining after the reaction may be removed by sieving through a 300 mesh screen so as to leave the titanium compound and zircon grains on the sieve, the carbon passing through the sieve. If desired, the carbon may readily be blown out by suitable air separation equipment, or it may be floated off during course of the later separation on a wet or dry gravity table.

Reference is made to our copending application, Serial 98,598, filed Aug. 28, 1936, entitled "Separating brookite and rutile from zircon and obtaining titanium oxide therefrom."

We claim as our invention:—

1. The method of separating a mechanically inseparable mixture of titanium oxide minerals and zircon, which comprises heating said mixture in the presence of carbon without sintering under reducing conditions to form a free-flowing, granular titanium-oxygen-carbon compound from the titanium oxide minerals while leaving the zircon unaltered, and then separating said titanium compound from the zircon.

2. The method of separating a mechanically inseparable mixture of titanium oxide minerals and zircon, which comprises heating said mixture in the presence of carbon without sintering under reducing conditions between 900° C. and 1600° C. to form a free-flowing, granular titanium-oxygen-carbon compound from the titanium oxide minerals while leaving the zircon unaltered, and then separating said titanium compound from the zircon.

3. The method of separating a mechanically inseparable mixture of titanium oxide minerals and zircon, which comprises heating said mixture in the presence of carbon without sintering under reducing conditions between 900° C. and 1600° C. without materially affecting the zircon grains to form a free-flowing, granular titanium-oxygen-carbon compound from the titanium oxide minerals, and then separating said titanium compound from the zircon.

4. The method of separating a mechanically inseparable mixture of titanium oxide minerals and zircon, which comprises heating said mixture at elevated temperatures in the presence of carbon under reducing conditions without sintering or fusion but with reaction of the titanium oxide minerals to form a free-flowing, granular titanium-oxygen-carbon compound, and then separating said titanium compound from the unaltered zircon.

5. The method of separating a mechanically inseparable mixture of titanium oxide minerals and zircon, which comprises heating said mixture between 900° C. and 1600° C. in the presence of carbon under reducing conditions without sintering or fusion but with reaction of the titanium oxide minerals to form a free-flowing, granular titanium-oxygen-carbon compound, and then separating said titanium compound from the unaltered zircon.

6. The method of separating a mechanically inseparable mixture of titanium oxide minerals and zircon, which comprises heating said mixture between 900° C. and 1600° C. in the presence of carbon under reducing conditions without sintering or fusion but with reaction of the titanium oxide minerals to form a free-flowing, granular titanium-oxygen-carbon compound without materially affecting the zircon grains, and then separating said titanium compound from the unaltered zircon.

7. In the method of separating a mechanically inseparable mixture of titanium oxide minerals and zircon, the step which consists in bringing into reaction at temperatures below sintering or fusion, said mixture in the presence of carbon under reducing conditions without materially affecting the zircon grains to form a free-flowing, granular titanium-oxygen-carbon compound from the titanium oxide minerals.

8. In the method of separating a mechanically inseparable mixture of titanium oxide minerals and zircon, the step which consists in bringing into reaction between 900° C. and 1600° C. without sintering or fusion of the charge, said mixture in the presence of a lesser amount of carbon under reducing conditions, without materially affecting the zircon grains, to form a free-flowing, granular titanium-oxygen-carbon compound from the titanium oxide minerals.

9. In the method of separating a mechanically inseparable mixture of titanium oxide minerals and zircon, the step which consists in bringing into reaction between 900° C. and 1600° C. said mixture in the presence of a lesser amount of carbon under reducing conditions without sintering or fusion of the charge to form a free-flowing, granular titanium-oxygen-carbon compound from the titanium oxide minerals without materially affecting the zircon grains.

10. The method of separating a mechanically inseparable brookite-rutile-zircon concentrate which comprises heating said concentrate in the presence of carbon under reducing conditions between 900° C. and 1600° C. without sintering or fusion of the charge and then cooling the charge in a reducing atmosphere to form a free-flowing granular dititanoso-titanic carboxide from the brookite and rutile without affecting the zircon grains, and then separating said granular carboxide from the zircon.

11. The method of separating a mechanically inseparable brookite-rutile-zircon concentrate which comprises heating said concentrate in the presence of carbon under reducing conditions between 900° C. and 1600° C. without sintering or fusion of the charge, and then cooling the charge in a reducing atmosphere to form a free-flowing granular dititanoso-titanic carboxide from the brookite and rutile without affecting the zircon grains, and then separating said granular carboxide from the zircon.

12. The method of separating a mechanically inseparable brookite-rutile-zircon concentrate which comprises heating said concentrate in the presence of a lesser amount of finely-divided carbon under reducing conditions between 900° C. and 1600° C. without sintering or fusion of the charge, and then cooling the charge in a reducing atmosphere to form a free-flowing granular dititanoso-titanic carboxide from the brookite and rutile without affecting the zircon grains, and then separating said granular carboxide from the zircon.

13. A titanium compound containing in chemical combination 65.45% titanium, 29.10% oxygen and 5.45% carbon.

14. A dititanoso-titanic carboxide having the empirical formula $Ti_3O_4C$.

15. A dititanoso-titanic-carboxide containing titanium, oxygen and carbon, having the empirical formula $(Ti_3O_4C)$, and consisting of separable crystalline grains having velvety opaque fissured surfaces and being readily reactive with chemical agents.

16. A dititanoso-titanic-carboxide containing titanium, oxygen and carbon, having the empirical formula $(Ti_3O_4C)$, and consisting of separable crystalline grains having velvety opaque fissured surfaces and being readily reactive with chemical agents, and having a specific gravity of 3.93.

17. A titanium compound containing in chemical combination 65.45% titanium, 29.10% oxygen and 5.45% carbon and having a specific gravity of 3.93.

CHARLES J. KINZIE.
EUGENE WAINER.